(12) United States Patent
Tamura et al.

(10) Patent No.: US 8,194,316 B2
(45) Date of Patent: Jun. 5, 2012

(54) THREE-DIMENSIONAL IMAGE DISPLAY APPARATUS

(75) Inventors: Yoshiyuki Tamura, Niigata (JP); Kei Fukaishi, Niigata (JP); Yuichi Kakubari, Niigata (JP); Hideki Ohshima, Niigata (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 400 days.

(21) Appl. No.: 12/060,276

(22) Filed: Apr. 1, 2008

(65) Prior Publication Data
US 2009/0190213 A1 Jul. 30, 2009

(30) Foreign Application Priority Data
Jan. 25, 2008 (JP) ................... 2008-015516

(51) Int. Cl.
*G02B 27/26* (2006.01)
(52) U.S. Cl. .......................... 359/465; 348/58
(58) Field of Classification Search .................. None
See application file for complete search history.

(56) References Cited

U.S. PATENT DOCUMENTS

| | | | | |
|---|---|---|---|---|
| 6,046,787 A * | 4/2000 | Nishiguchi | ............... | 349/129 |
| 2003/0184704 A1 | 10/2003 | Akiyama et al. | | |
| 2006/0146202 A1 | 7/2006 | Ioki et al. | | |
| 2008/0259230 A1* | 10/2008 | Miyakita et al. | ............... | 349/8 |

FOREIGN PATENT DOCUMENTS

| | | |
|---|---|---|
| JP | 08-320485 | 12/1996 |
| JP | 10-253824 | 9/1998 |
| JP | 2002-523569 | 7/2002 |
| JP | 2004-091605 | 3/2004 |
| JP | 2007-248696 | 9/2007 |

OTHER PUBLICATIONS

Office Action of Japanese Counterpart Application, issued on Mar. 2, 2020. Patial translation attached as a concise explanation of relevance. A related information Disclosure Statement disclosing the Japanese Offce action was already submitted on Mar. 17, 2010.
European Search Report dated Oct. 18, 2010, in a counterpart European patent application No. 08153914. 0 for Examiner consideration, citing U.S. Patent No. 1, U.S. Patent Application Publication Nos. 1-2 listed above.

* cited by examiner

*Primary Examiner* — Lee Fineman
(74) *Attorney, Agent, or Firm* — Chen Yoshimura LLP

(57) ABSTRACT

It is aimed to reduce the occurrence of crosstalk attributable to the thermal expansion/contraction of a retarder and an image display section, and the unevenness in color attributable to the uneven surfaces of the retarder and the image display section. It is also aimed to reduce the misalignment of the retarder with respect to the image display section. The exit surface of an image display section 130 and the entrance surface of a retarder 180 are adhered to each other by using an adhesion layer 300. Additionally, the left and right edges of the image display section 130 are adhered to the left and right edges of the retarder 180 by using adhesion regions 400. Here, the adhesion regions 400 have a higher glass transition temperature than the adhesion layer 300.

12 Claims, 19 Drawing Sheets

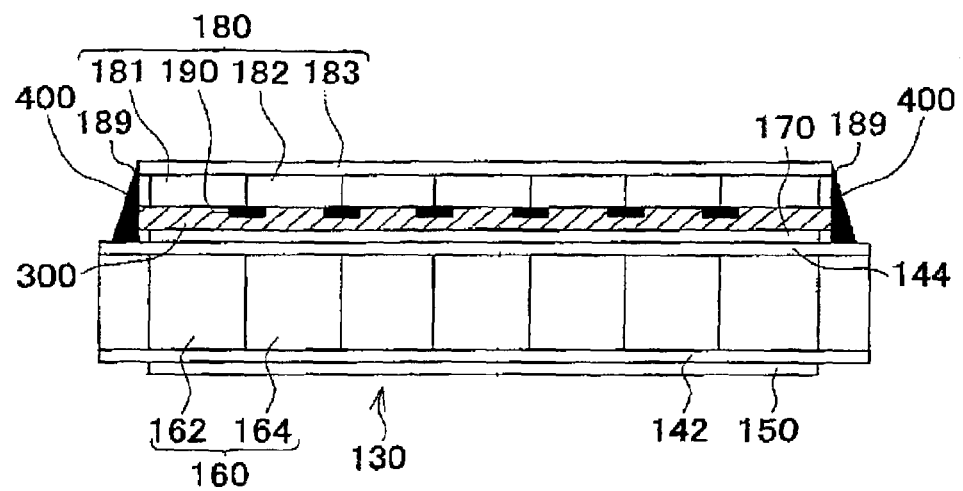
F I G. 10A
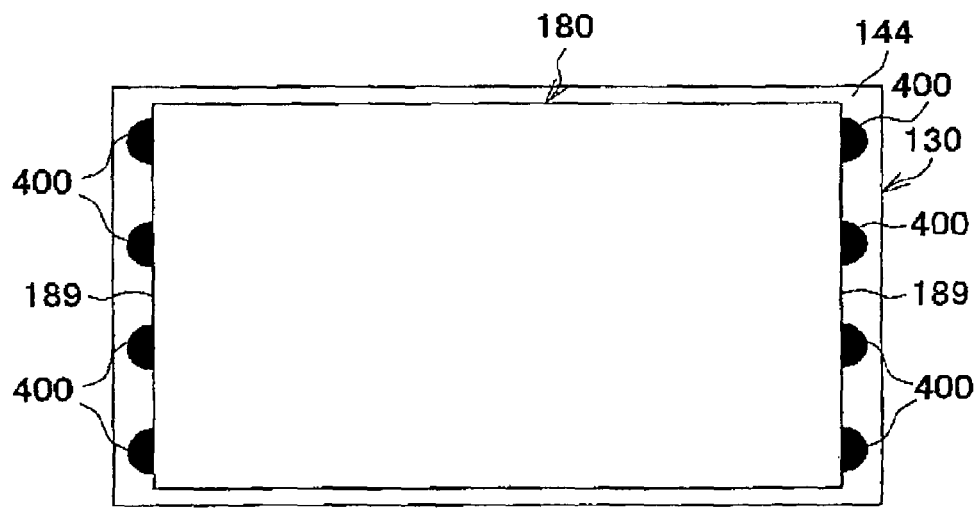
F I G. 10B

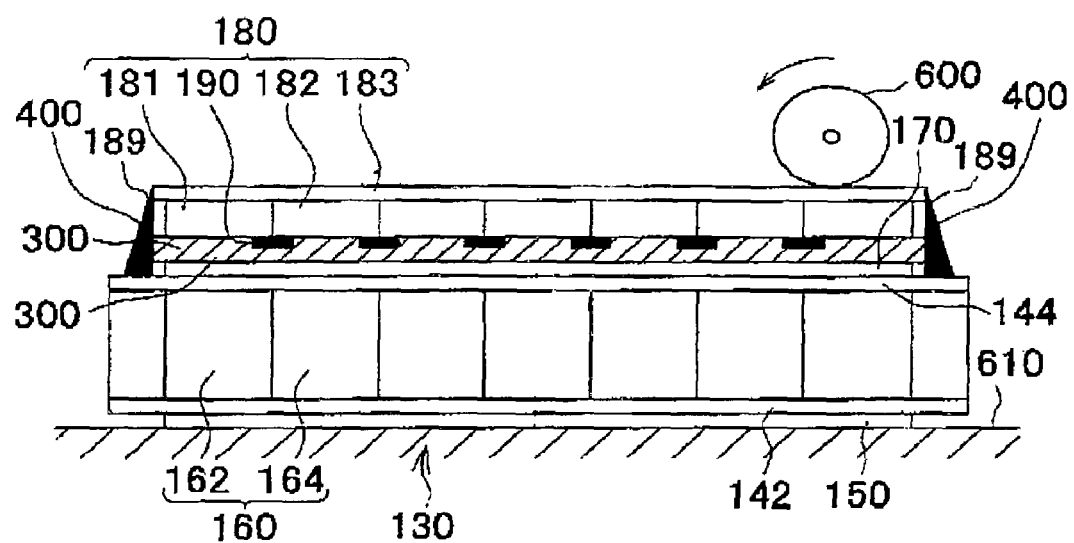
F I G . 12

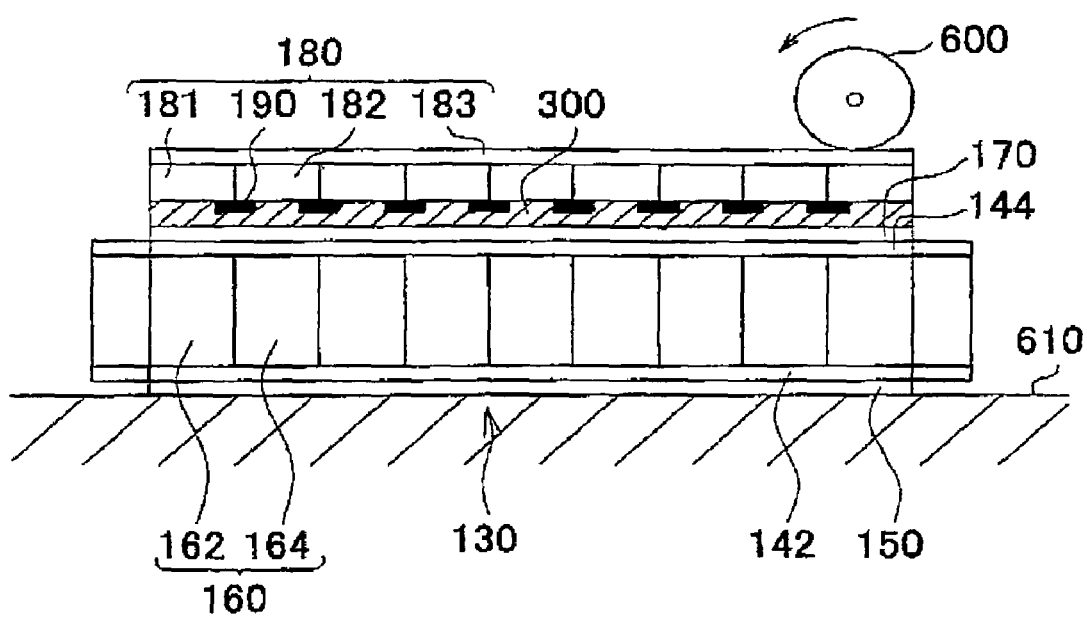
F I G . 19

THREE-DIMENSIONAL IMAGE DISPLAY APPARATUS

CROSS REFERENCE TO RELATED APPLICATION

This patent application claims priority from a Japanese patent application No. 2008-015516 filed on Jan. 25, 2008, the contents of which are incorporated herein by reference.

BACKGROUND

1. Technical Field

The present invention relates to a three-dimensional image display apparatus and a manufacturing method thereof. More particularly, the present invention relates to a three-dimensional image display apparatus in which the peripheral portion of a retarder is adhered to an image display section, and to a manufacturing method for such a three-dimensional image display apparatus.

2. Description of the Related Art

A known three-dimensional image display apparatus includes a combination of a liquid crystal display and a retarder, for example, as disclosed in Japanese Patent Application Publication No. 10-253824. In this three-dimensional image display apparatus, the retarder is adhered to one of the surfaces of the liquid crystal display which is closer to a viewer, by using an adhesive.

Here, the liquid crystal display and the retarder expand/contract when heated up/cooled down during the manufacturing process of the three-dimensional image display apparatus, and therefore deform. Apart from this, the retarder may have an uneven surface. For these reasons, the adhesive used to adhere together the liquid crystal display and the retarder is required to be flexible enough to be capable of deforming in response to the deformation of the liquid crystal display and the retarder or to be capable of realizing flatness in spite of the distorted surfaces of the liquid crystal display and the retarder- and the unevenness of the thicknesses of the liquid crystal display and the retarder. Which is to say, the adhesive is required to be sufficiently flexible to be capable of absorbing the deformation and the unevenness of the surfaces.

One type of adhesives satisfying such a requirement are adhesives with a reduced glass transition temperature. The adhesives having a low glass transition temperature, however, are likely to creep when experiencing heat and force during the manufacturing process of the three-dimensional image display apparatus and when the three-dimensional image display apparatus is used under the high-temperature environment. Therefore, the retarder may be misaligned with respect to the image display section of the liquid crystal display.

SUMMARY

Therefore, it is an object of an aspect of the innovations herein to provide a three-dimensional image display apparatus and a manufacturing method thereof, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary three-dimensional image display apparatus may include a three-dimensional image display apparatus including an image display section that includes an image generating section constituted by a right eye image generating region for generating right eye image light and a left eye image generating region generating left eye image light, where the image display section emits (i) the right eye image light as linearly polarized light whose polarization axis extends in a given direction and (ii) the left eye image light as linearly polarized light whose polarization axis extends in a direction parallel to the given direction, a retarder that is positioned in front of the image display section in a light proceeding direction, where the retarder includes a right eye polarization region and a left eye polarization region, an adhesion layer that adheres together an exit surface of the image display section and an entrance surface of the retarder, where the adhesion layer is provided in a region in which the right eye polarization region and the left eye polarization region of the retarder overlap the right eye image generating region and the left eye image generating region of the image display section, and an adhesion region that adheres together the image display section and a periphery portion of the retarder. Here, when the right eye image light and the left eye image light emitted from the image display section are respectively incident on the right eye polarization region and the left eye polarization region of the retarder, the retarder (I) emits the right eye image light as linearly polarized light whose polarization axis extends in a certain direction and emits the left eye image light as linearly polarized light whose polarization axis extends in a direction orthogonal to the certain direction, or (II) emits the right eye image light as circularly polarized light whose polarization axis rotates in one direction and emits the left eye image light as circularly polarized light whose polarization axis rotates in an opposite direction. Also, a glass transition temperature of an adhesive forming the adhesion region is higher than a glass transition temperature of an adhesive forming the adhesion layer.

According to a second aspect related to the innovations herein, one exemplary manufacturing method may include a manufacturing method of a three-dimensional image display apparatus including an image display section that includes an image generating section constituted by a right eye image generating region for generating right eye image light and a left eye image generating region generating left eye image light, where the image display section emits (i) the right eye image light as linearly polarized light whose polarization axis extends in a given direction and (ii) the left eye image light as linearly polarized light whose polarization axis extends in a direction parallel to the given direction, and a retarder that is positioned in front of the image display section in a light proceeding direction, where the retarder includes a right eye polarization region and a left eye polarization region. Here, when the right eye image light and the left eye image light emitted from the image display section are respectively incident on the right eye polarization region and the left eye polarization region of the retarder, the retarder (I) emits the right eye image light as linearly polarized light whose polarization axis extends in a certain direction and emits the left eye image light as linearly polarized light whose polarization axis extends in a direction orthogonal to the certain direction, or (II) emits the right eye image light as circularly polarized light whose polarization axis rotates in one direction and emits the left eye image light as circularly polarized light whose polarization axis rotates in an opposite direction. The manufacturing method includes attaching an adhesion sheet containing a curable resin to at least one of an exit surface of the image display section and an entrance surface of the retarder, where the adhesion sheet is formed in a region in which the right eye polarization region and the left eye polarization region in the retarder overlap the right eye image generating region and the left eye image generating region in the image display section, layering the retarder on the image display section in such a manner that the entrance surface of the retarder faces the exit surface of the image display section, applying a resin onto a periphery portion of the image display section and onto a periphery portion of the retarder, adhering together the periphery portions by curing the resin applied to the periphery portions, after layering the retarder on the image display section and applying the resin to the periphery portions, and adhering together the image display section and the retarder by curing the resin between the image display section and the retarder, after adhering together the periphery portions.

According to a third aspect related to the innovations herein, one exemplary manufacturing method may include a manufacturing method of a three-dimensional image display apparatus including an image display section that includes an image generating section constituted by a right eye image generating region for generating right eye image light and a left eye image generating region generating left eye image light, where the image display section emits (i) the right eye image light as linearly polarized light whose polarization axis extends in a given direction and (ii) the left eye image light as linearly polarized light whose polarization axis extends in a direction parallel to the given direction, and a retarder that is positioned in front of the image display section in a light proceeding direction, where the retarder includes a right eye polarization region and a left eye polarization region. Here, when the right eye image light and the left eye image light emitted from the image display section are respectively incident on the right eye polarization region and the left eye polarization region of the retarder, the retarder (I) emits the right eye image light as linearly polarized light whose polarization axis extends in a certain direction and emits the left eye image light as linearly polarized light whose polarization axis extends in a direction orthogonal to the certain direction, or (II) emits the right eye image light as circularly polarized light whose polarization axis rotates in one direction and emits the left eye image light as circularly polarized light whose polarization axis rotates in an opposite direction. The manufacturing method includes applying a resin onto at least one of an exit surface of the image display section and an entrance surface of the retarder, where the resin is applied in a region in which the right eye polarization region and the left eye polarization region in the retarder overlap the right eye image generating region and the left eye image generating region in the image display section, layering the retarder on the image display section in such a manner that the entrance surface of the retarder faces the exit surface of the image display section, after applying the resin, applying a resin onto a periphery portion of the image display section and onto a periphery portion of the retarder, adhering together the periphery portions by curing the resin applied to the periphery portions, after layering the retarder on the image display section and applying the resin onto the periphery portions, and adhering together the image display section and the retarder by curing the resin between the image display section and the retarder, after adhering together the periphery portions.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 10A is a cross-sectional view illustrating a periphery applying step, and FIG. 10B is a plan view illustrating the periphery applying step.

FIG. 12 is a cross-sectional view illustrating a vacuum laminating step.

FIG. 19 is a cross-sectional view illustrating a vacuum laminating step included in the different manufacturing method relating to the embodiment.

DESCRIPTION OF EXEMPLARY EMBODIMENTS

Some aspects of the invention will now be described based on embodiments, which do not intend to limit the scope of the present invention, but exemplify the invention. All of the features and the combinations thereof described in the embodiments are not necessarily essential to the invention.

Figure 1:
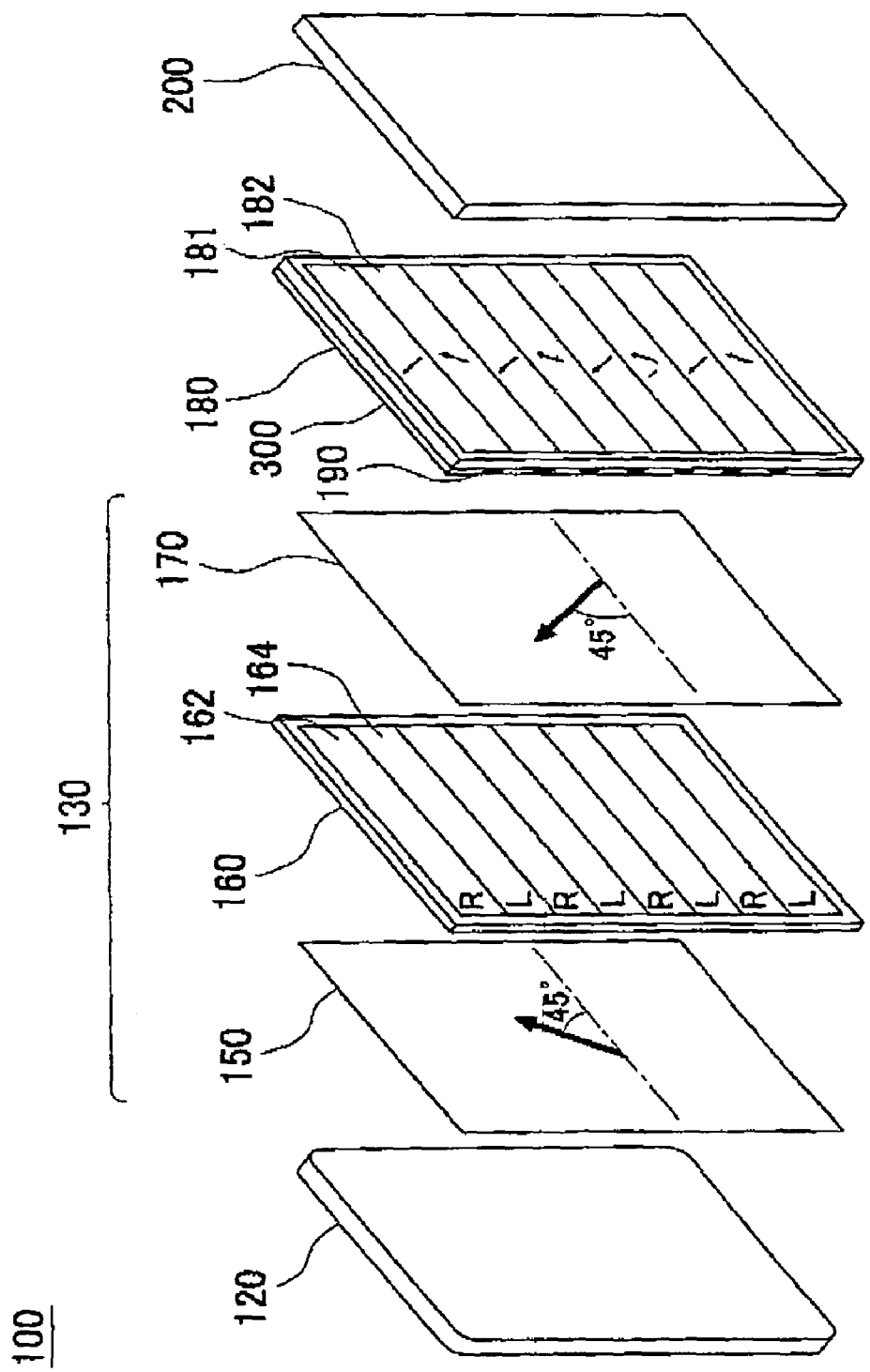
FIG. 1 is an exploded perspective view illustrating a three-dimensional image display apparatus 100 manufactured by a manufacturing method relating to an embodiment of the present invention.

FIG. 1 is an exploded perspective view illustrating a three-dimensional image display apparatus 100 manufactured by a manufacturing method relating to an embodiment of the present invention. As illustrated in FIG. 1, the three-dimensional image display apparatus 100 includes a light source 120, an image display section 130, a retarder 180, and an antireflection layer 200, in the stated order. The image display section 130 includes therein an entrance-side polarization plate 150, an image generating section 160, and an exit-side polarization plate 170. Note that the three-dimensional image display apparatus 100 may be constructed without the antireflection layer 200. Here, a viewer 500 (mentioned later) views a three-dimensional image displayed on the three-dimensional image display apparatus 100 from the right of the antireflection layer 200 in FIG. 1.

The light source 120 is positioned most distant, in the three-dimensional image display apparatus 100, from the viewer 500. In the state in which the three-dimensional image display apparatus 100 is used (hereinafter, simply referred to as "in the usage state of the three-dimensional image display apparatus 100"), the light source 120 emits white non-polarized light towards one of the surfaces of the entrance-side polarization plate 150. In the present embodiment, the light source 120 is realized by a surface light source. In place of the surface light source, the light source 120 may be realized by combining a point light source and a collective lens, for example. An example of the collective lens is a Fresnel lens sheet.

The entrance-side polarization plate 150 is positioned between the image generating section 160 and the light source 120. The entrance-side polarization plate 150 has a transmission axis and an absorption axis orthogonal to the transmission axis. Therefore, when the non-polarized light emitted from the light source 120 is incident on the entrance-side polarization plate 150, the entrance-side polarization plate 150 transmits therethrough light whose polarization axis is parallel to the direction in which the transmission axis of the entrance-side polarization plate 150 extends, and blocks light whose polarization axis is parallel to the direction in which the absorption axis of the entrance-side polarization plate 150 extends. Here, the direction of the polarization axis of light represents the vibration direction of the electric field in the light. The transmission axis of the entrance-side polarization plate 150 extends in the direction having an angle of 45°, towards the upper right, with respect to the horizontal direction defined when the viewer 500 views the three-dimensional image display apparatus 100, as illustrated by the arrow in FIG. 1.

The image generating section 160 has right eye image generating regions 162 and left eye image generating regions 164. As illustrated in FIG. 1, the right eye image generating regions 162 and the left eye image generating regions 164 are obtained by partitioning the image generating section 160 into a plurality of regions each extending in the horizontal direction. The right eye image generating regions 162 and the left eye image generating regions 164 are alternately arranged so as to be adjacent to each other in the vertical direction.

In the usage state of the three-dimensional image display apparatus 100, right eye images and left eye images are respectively generated in the right eye image generating regions 162 and the left eye image generating regions 164 in the image generating section 160. Specifically speaking, when the light which has transmitted through the entrance-side polarization plate 150 is incident on the right eye image generating regions 162 in the image generating section 160, the transmitted light through the right eye image generating regions 162 constitutes image light for the right eye images (hereinafter, referred to as "the right eye image light"). Similarly, when the light which has transmitted through the entrance-side polarization plate 150 is incident on the left eye image generating regions 164 in the image generating section 160, the transmitted light through the left eye image generating regions 164 constitutes image light for the left eye images (hereinafter, referred to as "the left eye image light").

Note that the right eye image light which has transmitted through the right eye image generating regions 162 and the left eye image light which has transmitted through the left eye image generating regions 164 are each linearly polarized light having a polarization axis extending in a particular direction. The right eye image light and the left eye image light may have the polarization axes extending in the same direction. In the example shown in FIG. 1, the polarization axes of the right eye image light and the left eye image light are set so as to extend in the same direction as the transmission axis of the exit-side polarization plate 170 (mentioned later). The image generating section 160 having the above-described configuration is realized, for example, by using a liquid crystal display (LCD) configured in such a manner that a plurality of minute cells are arranged two-dimensionally in the horizontal and vertical directions and liquid crystal is sealed between the alignment films in each cell. When each cell is electrically driven in the LCD, the state of each cell is switched between the state in which the cell transmits light therethrough without changing the direction of the polarization axis of the light and the state in which the cell transmits light therethrough with rotating the direction of the polarization axis of the light by an angle of 90°.

The exit-side polarization plate 170 is positioned between the image generating section 160 and the viewer 500. When the right eye image light which has transmitted through the right eye image generating regions 162 and the left eye image light which has transmitted through the left eye image generating regions 164 are incident on the exit-side polarization plate 170, the exit-side polarization plate 170 transmits therethrough light whose polarization axis is parallel to the transmission axis of the exit-side polarization plate 170, and blocks light whose polarization axis is parallel to the absorption axis of the exit-side polarization plate 170. The transmission axis of the exit-side polarization plate 170 extends in the direction having an angle of 45°, toward the upper left, with respect to the horizontal direction defined when the viewer 500 views the three-dimensional image display apparatus 100, as illustrated by the arrow in FIG. 1. Which is to say, the right eye image light and the left eye image light emitted from the image display section 130 are each linear light, and have polarization axes parallel to each other. It should be noted that the polarization axes of the right eye image light and the left eye image light do not need to be exactly parallel to each other, and may only be required to be approximately parallel to each other to such a degree that the viewer 500 can perceive a three-dimensional image based on the right eye image light and the left eye image light.

The retarder 180 has right eye polarization regions 181 and left eye polarization regions 182. As illustrated in FIG. 1, the positions and sizes of the right eye polarization regions 181 and the left eye polarization regions 182 in the retarder 180 are determined in correspondence with the positions and sizes of the right eye image generating regions 162 and the left eye image generating regions 164 in the image generating section 160. Therefore, in the usage state of the three-dimensional image display apparatus 100, the right eye image light which has transmitted through the right eye image generating regions 162 is incident on the right eye polarization regions 181, and the left eye image light which has transmitted through the left eye image generating regions 164 is incident on the left eye polarization regions 182.

In the surface of the retarder 180 which faces the image display section 130, opaque sections 190 are provided on the borders between the right eye polarization regions 181 and the left eye polarization regions 182. Here, the left eye image light is expected to be incident on each left eye polarization region 182 in the retarder 180, but partial light of the left eye image light actually tends to be incident on right eye polarization regions 181 adjacent to the left eye polarization region 182 across the boarders therebetween. Each opaque section 190 absorbs and thus blocks such partial light. Similarly, the right eye image light is expected to be incident on each right eye polarization region 181 in the retarder 180, but partial light of the right eye image light actually tends to be incident on left eye polarization regions 182 adjacent to the right eye polarization region 181 across the boarders therebetween. Each opaque section 190 absorbs and thus blocks such partial light. Hence, by providing the opaque sections 190 on the borders in the retarder 180, less crosstalk is generated in the right eye image light and the left eye image light emitted from the three-dimensional image display apparatus 100.

The right eye polarization regions 181 transmit therethrough the incident right eye image light without rotating the polarization axis. On the other hand, the left eye polarization regions 182 rotate the polarization axis of the incident left eye image light so that the polarization axis extends in the direction orthogonal to the polarization axis of the right eye image light incident on the right eye polarization regions 181. Therefore, the direction of the polarization axis of the right eye image light which has transmitted through the right eye polarization regions 181 becomes orthogonal to the direction of the polarization axis of the left eye image light which has transmitted through the left eye polarization regions 182, as illustrated by the arrows in FIG. 1. Here, the directions of the polarization axes of the right eye image light and the left eye image light may not cross each other at exactly right angles, but may only be required to be approximately orthogonal to each other to such a degree that the viewer 500 can perceive a three-dimensional image based on the right eye image light and the left eye image light.

Note that, in FIG. 1, each of the arrows in the retarder 180 indicates the direction of the polarization axis of the polarized light which has transmitted through the retarder 180. The right eye polarization regions 181 are formed, for example, by using a transparent resin, transparent glass, or the like. The left eye polarization regions 182 are formed, for example, by using half wavelength retarders whose optical axis has an angle of 45° with respect to the direction of the polarization axis of the left eye image light which is incident on the left eye polarization regions 182. In the example shown in FIG. 1, the optical axis of the left eye polarization regions 182 extends in the horizontal or vertical direction. Here, the optical axis indicates one of the phase advancing axis and the phase delaying axis which are defined when the light transmits through the left eye polarization regions 182. Differently from the above-described configuration of the retarder 180, both the right eye polarization regions 181 and the left eye polarization regions 182 may be formed by using half wavelength retarders. In this case, similarly, when the right eye image light and the left eye image light are incident on the retarder 180, the right eye polarization regions 181 and the left eye polarization regions 182 may emit linearly polarized light for the right eye image and linearly polarized light for the left eye image which have polarization axes orthogonal to each other.

Figure 2:
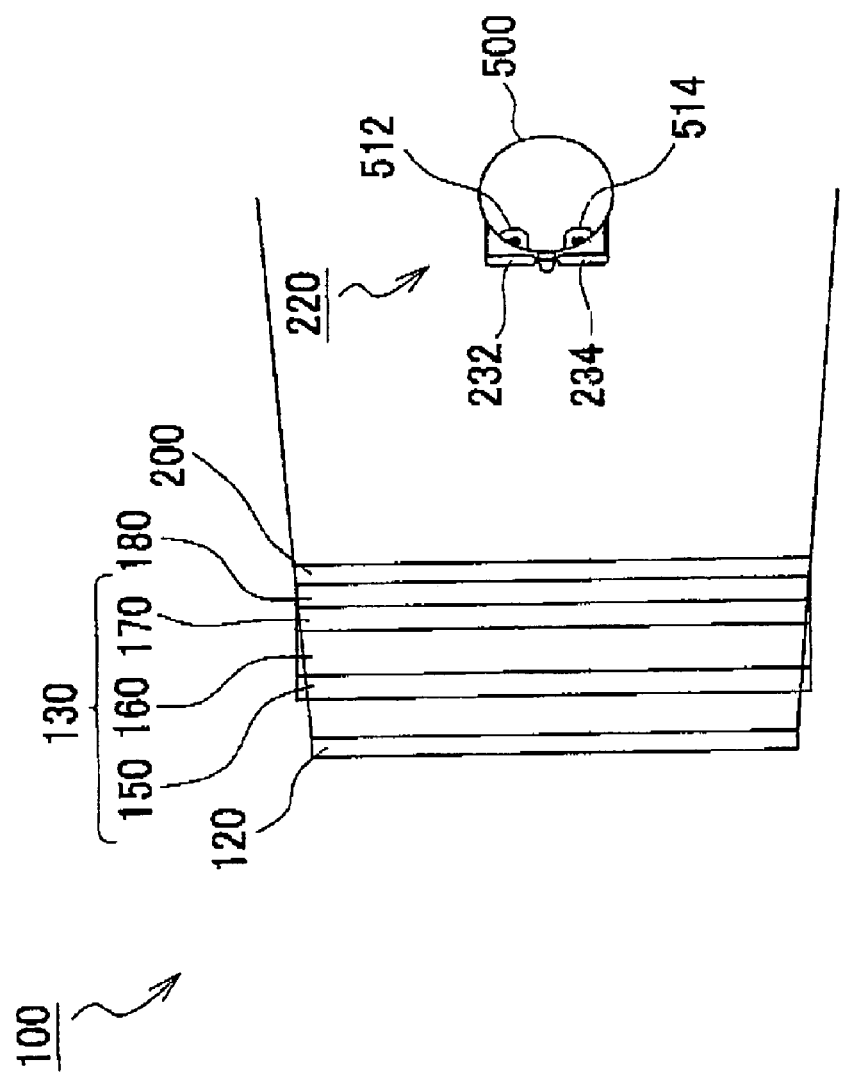
FIG. 2 is a schematic view illustrating the usage state of the three-dimensional image display apparatus 100.

FIG. 2 is a schematic view illustrating the usage state of the three-dimensional image display apparatus 100. When viewing a three-dimensional image by means of the three-dimensional image display apparatus 100, the viewer 500 views the right eye image light and the left eye image light projected from the three-dimensional image display apparatus 100 with wearing polarized glasses 220, as illustrated in FIG. 2. The polarized glasses 220 have a right eye image transmitting section 232 and a left eye image transmitting section 234. When the viewer 500 wears the polarized glasses 220, the right eye image transmitting section 232 is positioned in correspondence with a right eye 512 of the viewer 500, and the left eye image transmitting section 234 is positioned in correspondence with a left eye 514 of the viewer 500. The right eye image transmitting section 232 and the left eye image transmitting section 234 are formed by using polarized lenses whose transmission axes extend in different directions, and are fixed to the frame of the polarized glasses 220.

The right eye image transmitting section 232 is formed as a polarization plate in which the transmission axis extends in the same direction as the polarization axis of the right eye image light which has transmitted through the right eye polarization regions 181 and the absorption axis extends in the direction orthogonal to the direction of the transmission axis. The left eye image transmitting section 234 is formed as a polarization plate in which the transmission axis extends in the same direction as the polarization axis of the left eye image light which has transmitted through the left eye polarization regions 182 and the absorption axis extends in the direction orthogonal to the direction of the transmission axis. The right eye image transmitting section 232 and the left eye image transmitting section 234 are formed by using polarization lenses having polarization films attached thereto. Here, the polarization films are obtained, for example, by uniaxially elongating films in which a dichroic dye is immersed.

To view a three-dimensional image by means of the three-dimensional image display apparatus 100, the viewer 500 views the three-dimensional image display apparatus 100 with wearing the polarized glasses 220 as mentioned earlier, within the reach of the right eye image light and the left eye image light which have transmitted through the right eye polarization regions 181 and the left eye polarization regions 182 in the retarder 180. With the above-described polarized glasses 220, the right eye 512 can be limited to only view the right eye image light, and the left eye 514 can be limited to only view the left eye image light. As a result, the viewer 500 can perceive a three-dimensional image based on the right eye image light and the left eye image light.

Figure 3:
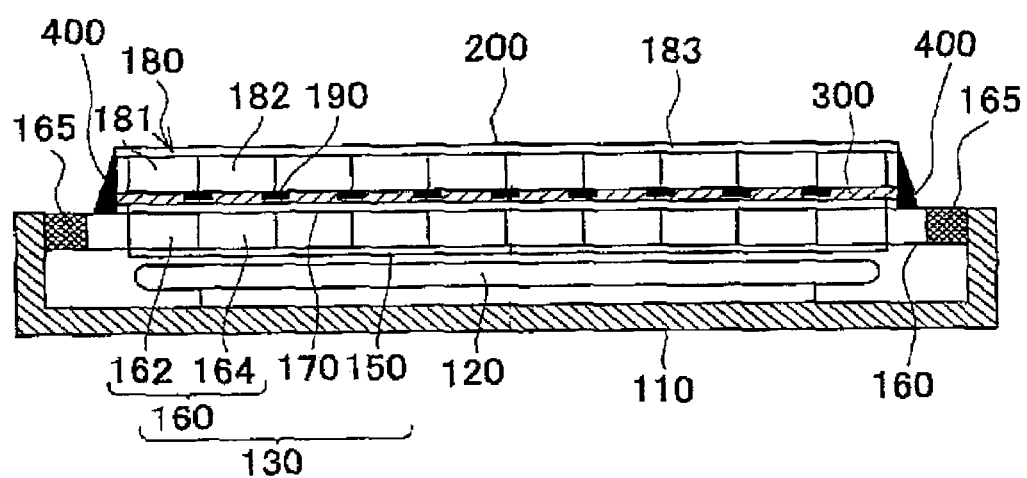
FIG. 3 is a schematic cross-sectional view illustrating the three-dimensional image display apparatus 100 housed within a case 110.

FIG. 3 is a schematic cross-sectional view illustrating the three-dimensional image display apparatus 100 housed within a case 110. As illustrated in FIG. 3, the image display section 130 is supported by an external frame 165. Additionally, the retarder 180 and the antireflection layer 200 are attached to the exit surface of the image display section 130. The case 110 houses therein the light source 120 and the image display section 130. Here, the retarder 180 is adhered to the image display section 130 by way of an adhesion layer 300 and adhesion regions 400.

The adhesion layer 300 preferably has the same thickness as the opaque sections 190. Here, the adhesion layer 300 and the opaque sections 190 may have exactly the same thickness, or the adhesion layer 300 may be up to approximately 1.5 times as thick as the opaque sections 190. For example, when the opaque sections 190 have a thickness of 10 µm to 15 µm, the adhesion layer 300 preferably has a thickness of 10 µm to 20 µm. As an alternative example, when the opaque sections 190 have a thickness of 2 µm to 3 µm, the adhesion layer 300 preferably has a thickness of 2 µm to 5 µm. The thickness of the adhesion layer 300 represents the thickness from the entrance surfaces of the right eye polarization regions 181 and the left eye polarization regions 182 in the retarder 180 to the exit surface of the exit-side polarization plate 170 in the image generating section 160. As the thickness of the opaque sections 190 decreases, it becomes less likely that bubbles are present between the adhesion layer 300 and the retarder 180.

Figure 4:
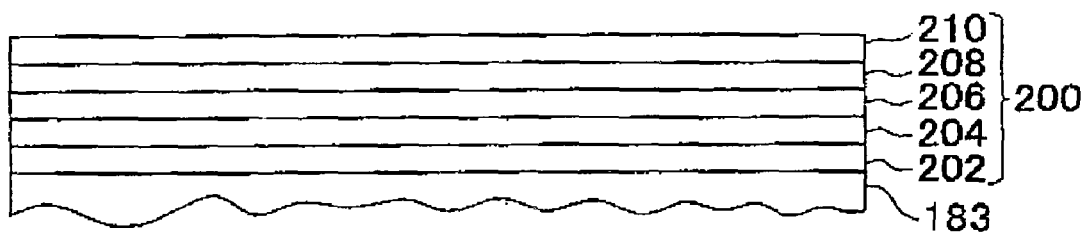
FIG. 4 illustrates an example of an antireflection layer 200.

FIG. 4 illustrates an example of the antireflection layer 200. In the three-dimensional image display apparatus 100, the antireflection layer 200 is positioned between the retarder 180 and the viewer 500. The antireflection layer 200 has therein an adhesion layer 202, a base member 204, a hard coating layer 206, a resin 208 with a high refractive index, and a resin 210 with a low refractive index in the stated order, which are formed on a glass substrate 183 of the retarder 180.

The adhesion layer 202 has a thickness of 25 μm, for example. The base member 204 is, for example, made of triacetyl cellulose (TAC) and has a thickness of 80 μm. The hard coating layer 206 has a thickness of 5 μm, for example. The high-refractive-index resin 208 and the low-refractive-index resin 210 respectively have refractive indices of 1.65 and 1.40, and have the same thickness of 0.1 μm. Note that the antireflection layer 200 is not limited to the above example and can be varied provided that the antireflection layer 200 does not disturb the polarized light emitted from the three-dimensional image display apparatus 100.

The following describes the manufacturing method of the above-described three-dimensional image display apparatus 100. The manufacturing method of the three-dimensional image display apparatus 100 relating to the present embodiment includes an attaching step and a layering step (an alignment step), a spot adhering step (a periphery adhering step), a vacuum laminating step (a laminating step), an autoclaving step, and an entire surface UV adhering step (an entire surface adhering step).

In the attaching step, the adhesion layer 300 is formed on the image display section 130. In the layering step, the retarder 180 is layered on the image display section 130 in such a manner that the exit surface of the image display section 130 faces the retarder 180. The point adhering step includes a periphery applying step and a periphery adhering step. In the periphery applying step, a resin is applied to the periphery of the exit surface of the image display section 130 and to the periphery of the retarder 180. In the periphery adhering step, the resin that has been applied in the periphery applying step is cured so that the exit surface of the image display section 130 is adhered to the periphery of the retarder 180.

In the vacuum laminating step, the image display section 130 and the retarder 180 are pressed against each other in the vacuum state, to be laminated together. In the autoclaving step, the image display section 130 and the retarder 180 are heated. In the entire surface UV adhering step, the adhesion layer 300 is cured so that the image display section 130 and the retarder 180 are adhered to each other.

Figure 5:
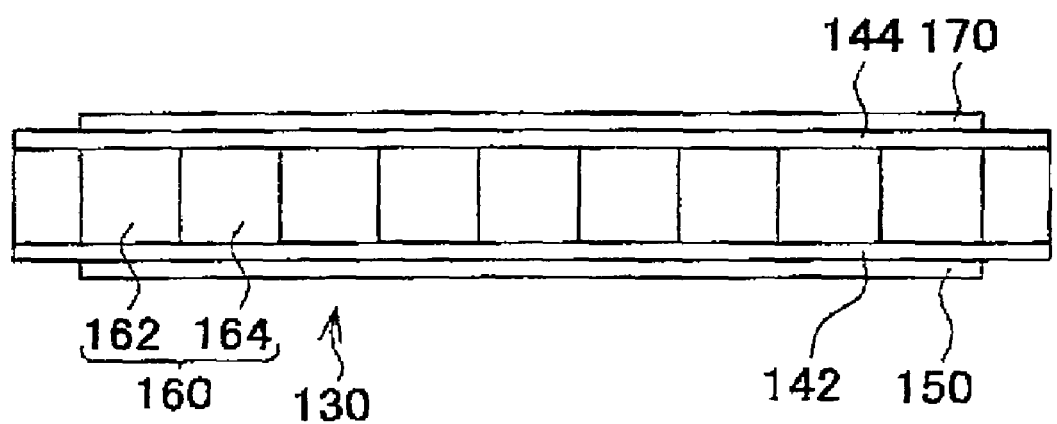
FIG. 5 is a schematic cross-sectional view illustrating an image display section 130 prior to an attaching step.

FIG. 5 is a schematic cross-sectional view illustrating the image display section 130 prior to the attaching step. Referring to the image display section 130 shown in FIG. 5, the image generating section 160 includes an entrance-side glass substrate 142 and an exit-side glass substrate 144. Furthermore, the image generating section 160 includes the right eye image generating regions 162 and the left eye image generating regions 164 which are formed by the liquid crystal sealed between the entrance-side glass substrate 142 and the exit-side glass substrate 144. Here, the entrance-side polarization plate 150 is positioned on the entrance surface of the entrance-side glass substrate 142, and the exit-side polarization plate 170 is positioned on the exit surface of the exit-side glass substrate 144.

Figure 6:
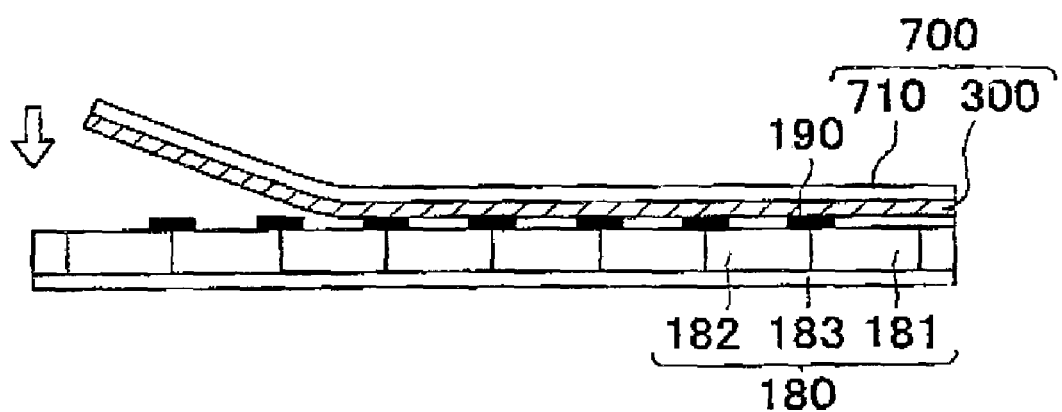
FIG. 6 is a cross-sectional view illustrating the attaching step.

FIG. 6 is a cross-sectional view illustrating the attaching step. As illustrated in FIG. 6, the attaching step includes a sub-step of attaching an adhesion sheet 700 to the entrance surface of the retarder 180. In the present example, the adhesion sheet 700 includes the adhesion layer 300 and a separation film 710 that supports the adhesion layer 300. The adhesive constituting the adhesion layer 300 is an ultraviolet curable resin, for example, a urethane acrylate resin such as ThreeBond® 1630 produced by ThreeBond® Co., Ltd.

According to the example shown in FIG. 6, the adhesion sheet 700 is placed on the retarder 180 in such a manner that the adhesion layer 300 is placed on the surface including the opaque sections 190. In this manner, the adhesion sheet 700 is attached to the retarder 180. Here, the adhesion sheet 700 may be obtained by pulling out a predetermined length from the rolls of adhesion sheet, and cutting off the predetermined length of adhesion sheet. Alternatively, the adhesion sheet 700 may be one of the single-cut sheets formed in advance. When the opaque sections 190 have a thickness of 3 μm to 10 μm, the adhesion layer 300 of the adhesion sheet 700 preferably has a thickness of 15 μm to 75 μm. When this condition is satisfied, the resin can be sufficiently spread within the depressed portions between the opaque sections 190. As a result, a flat and smooth surface can be achieved.

Figure 7:
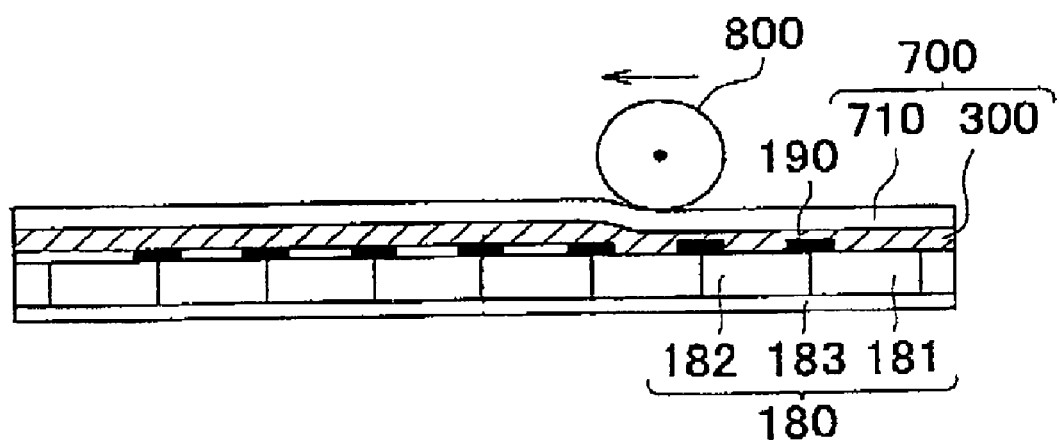
FIG. 7 is a cross-sectional view illustrating the attaching step.

FIG. 7 is a cross-sectional view illustrating a sub-step of the attaching step, which is subsequent to the sub-step shown in FIG. 6. As illustrated in FIG. 7, the attaching step further includes a sub-step of pressing a heated roller 800 against the separation film 710 of the adhesion sheet 700 which has been attached to the entrance surface of the retarder 180, to laminate the adhesion sheet 700 onto the retarder 180. In the laminating sub-step shown in FIG. 7, the roller 800 heated up to 80° C. to 85° C. is rotated and moved in the direction indicated by the arrow in FIG. 7 at the speed of 0.3 m/min on the adhesion layer 300 of the adhesion sheet 700 within a chamber in which the pressure is set to the atmospheric pressure (0.1 MPa). In this way, the adhesion sheet 700 is provisionally adhered to the retarder 180. By carrying out the laminating sub-step with the use of the heated roller 800, the adhesion layer 300 can fill the depressed portions formed by the opaque sections 190. As a result, the adhesion layer 300 is provided on the entire entrance surface of the retarder 180.

Here, it is preferable to concurrently perform the sub-step shown in FIG. 6 of attaching the adhesion sheet 700 to the retarder 180 and the laminating sub-step shown in FIG. 7. This can reduce the number of steps in the manufacturing method.

Figure 8:
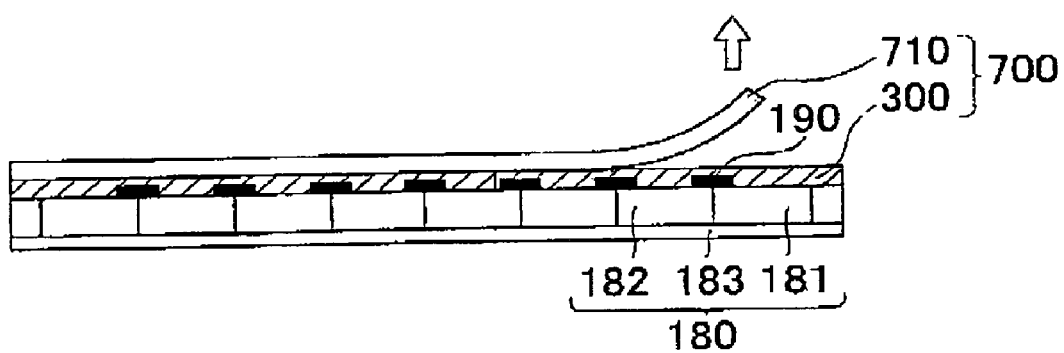
FIG. 8 is a cross-sectional view illustrating the attaching step.

FIG. 8 is a cross-sectional view illustrating a sub-step in the attaching step which is subsequent to the sub-step shown in FIG. 7. As illustrated in FIG. 8, the attaching step further includes a sub-step of removing the separation film 710 of the laminated adhesion sheet 700, from the adhesion layer 300. By performing this sub-step, the adhesion layer 300 remains attached to the retarder 180 in the state of externally exposed.

In the embodiment described with reference to FIGS. 6 to 8, the adhesion sheet 700 is adhered and laminated onto the retarder 180. Alternatively, the adhesion sheet 700 may be adhered and laminated onto the image display section 130.

Figure 9:
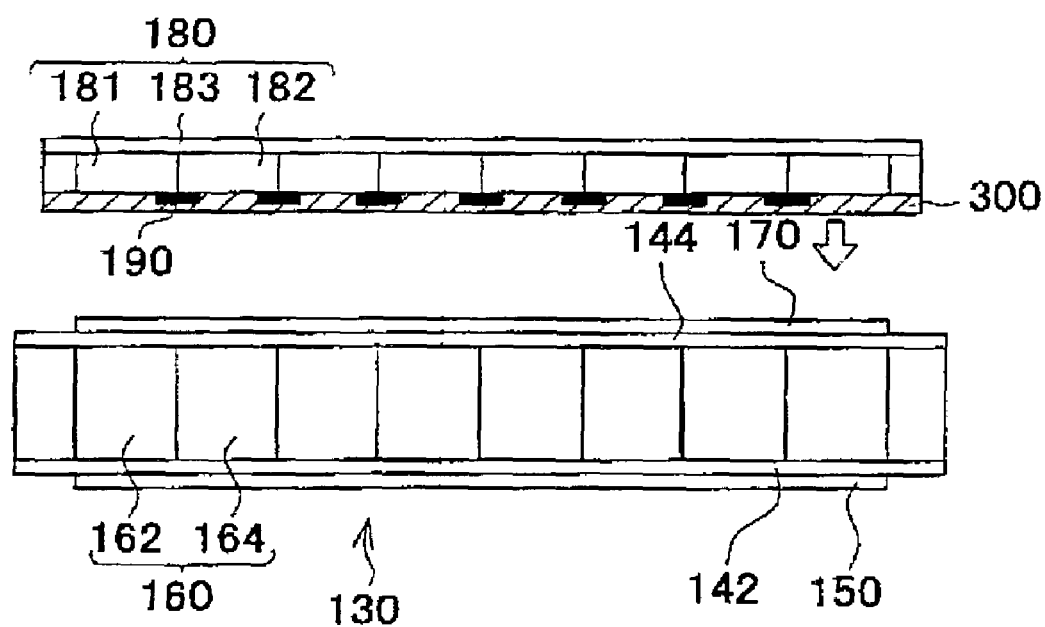
FIG. 9 is a cross-sectional view illustrating a layering step.

FIG. 9 is a cross-sectional view illustrating the layering step. In the layering step, the retarder 180 is put on the image display section 130 in such a manner that the adhesion layer 300 faces the exit-side polarization plate 170. Subsequently, the alignment between the retarder 180 and the image display section 130 is adjusted.

As illustrated in FIG. 9, the right eye polarization regions 181 and the left eye polarization regions 182 of the retarder 180 are supported by the glass substrate 183. The glass substrate 183 of the retarder 180 is thicker than the exit-side glass substrate 144 of the image display section 130, and the retarder 180 and the image display section 130 are adhered to each other at their entire surfaces. Therefore, the present embodiment can reduce the thickness of the exit-side glass substrate 144 with it being possible to maintain sufficient strength. The reduction in the thickness of the exit-side glass substrate 144 decreases the distance from the image generating section 160 of the image display section 130 to the right eye polarization regions 181 and the left eye polarization regions 182 of the retarder 180, thereby widening the viewing angle. For example, when the glass substrate 183 has a thickness of 0.7 mm, the thickness of the exit-side glass substrate 144 can be reduced so as to be equal to or smaller than 0.5 mm.

FIGS. 10A and 10B are cross-sectional views illustrating the periphery applying step in the point adhering step. In the periphery applying step, a resin (i.e., an adhesive) is applied onto a pair of left and right side surfaces 189 of the retarder 180 (the periphery portions of the retarder 180) and onto the left and right edge portions of the exit surface of the image display section 130, that is to say, the left and right edge portions of the exit-side glass substrate 144. Note that the resin forms a plurality of separate portions each of which has a predetermined width and which are arranged at predetermined intervals on each side surface 189.

In the above-described manner, the periphery applying step forms a plurality of adhesion regions 400 spaced away from each other on the pair of left and right side surfaces 189 of the retarder 180. The resin used in this step is, for example, an ultraviolet curable resin exemplified by an epoxy resin such as ThreeBond® 3114 and 3114B produced by ThreeBond® Co., Ltd. When the three-dimensional image display apparatus 100 has a 46-inch screen size, for example, the applied resin forms four regions each of which has a width of 2 mm and which are arranged at an interval of 80 mm, on each of the side surfaces 189 and on each of the edge portions of the image display section 130 which are positioned more outside than the side surfaces 189.

The lateral width of the exit-side polarization plate 170 is set smaller than the lateral width of the retarder 180. Thus, the adhesion regions 400 on the left and right sides are spaced away from the left and right side surfaces of the exit-side polarization plate 170. Additionally, the adhesion regions 400 are formed on the side surfaces of the glass substrate 183 in the retarder 180, and on the left and right edge portions of the exit-side glass substrate 144 in the image display section 130. Therefore, the expansion and contraction of the exit-side polarization plate 170 does not affect the adhesion regions 400. As a result, the present embodiment enables the viewer 500 to view a stable three-dimensional image.

Figure 11:
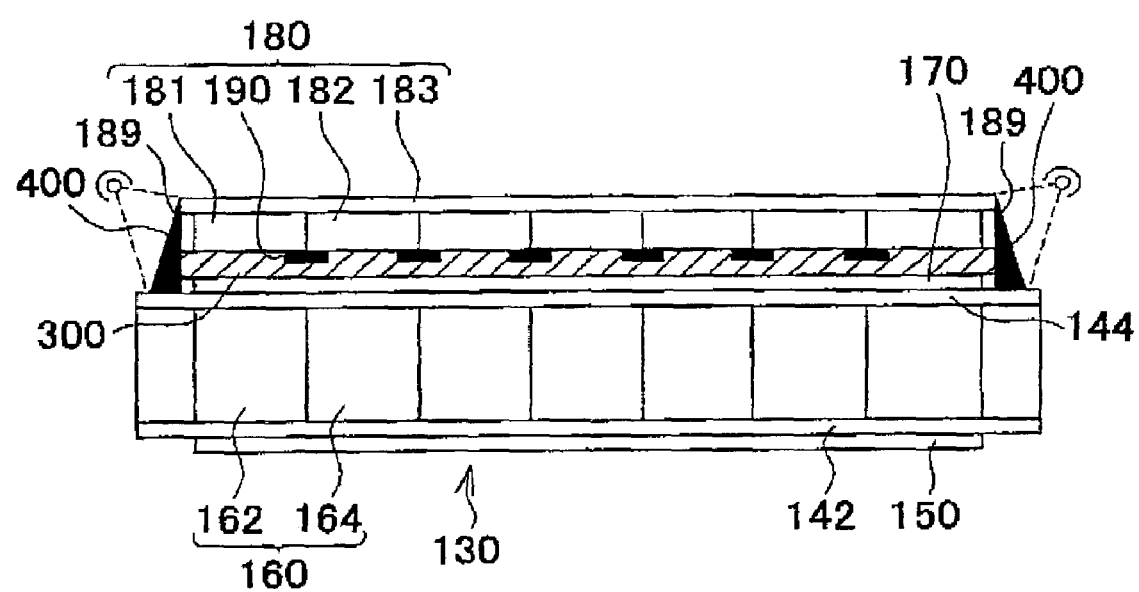
FIG. 11 is a cross-sectional view illustrating a periphery adhering step.

FIG. 11 is a cross-sectional view illustrating the periphery adhering step in the point adhering step. In the periphery adhering step, ultraviolet light is locally irradiated to the adhesion regions 400, so that the resin forming the adhesion regions 400 cures. For example, the ultraviolet light is irradiated under the condition that the integral light quantity is 3000 mJ/cm$^2$. As a result of the ultraviolet light irradiation, the left and right side surfaces of the glass substrate 183 in the retarder 180 are adhered to the left and right edge portions of the exit-side glass substrate 144 in the image display section 130.

FIG. 12 is a cross-sectional view illustrating the vacuum laminating step. In the vacuum laminating step, the image display section 130 and the retarder 180, which have been subjected to the above-described point adhering step, are placed on a stage 610 with the retarder 180 facing upwards within a vacuum furnace having the reduced pressure. Under the reduced pressure within the vacuum furnace, a roller 600 is rotated while being pressed against the glass substrate 183 of the retarder 180. For example, the vacuuming is performed for one minute, and the laminating processing is performed for six minutes at the laminating pressure of 950 MPa and at the laminating temperature of 80° C.

As a result of the vacuum laminating step, the image display section 130 and the retarder 180 are laminated together, and the resins forming the adhesion layer 300 and the adhesion regions 400 are deaerated. This can enable the adhesion layer 300 to have an even thickness, and enhance the flatness of the image display section 130 and the retarder 180 and the degree of parallelism between the image display section 130 and the retarder 180. Also, this can improve the transparency and adhesiveness of the resins. In the present embodiment, the roller laminating technique is adopted. Apart from this technique, the diaphragm laminating technique can be also employed, for example.

On completion of the laminating step, the thickness of the adhesion layer 300 preferably becomes equal to the thickness of the opaque sections 190. During the laminating step, the roller may be rotated so as to move in the direction in which the right eye image generating regions 162 and the left eye image generating regions 164 are adjacent to each other, as illustrated in FIG. 12. Alternatively, the roller may be rotated so as to move in the direction orthogonal to the moving direction illustrated in FIG. 12, that is to say, in the direction in which the right eye image generating regions 162 and the left eye image generating regions 164 extend.

The above-described vacuum laminating step is followed by the autoclaving step. In the autoclaving step, the image display section 130 and the retarder 180 are heated within an atmosphere in which the pressure is higher than the atmospheric pressure. The pressure of the atmosphere in which the heating step is carried out is preferably set higher than the laminating pressure for the above-described vacuum laminating step. In the autoclaving step, the image display section 130 and the retarder 180 are placed for one hour within a chamber in which the temperature is set at 80° C. and the pressure is set at 0.6 MPa, for example.

The autoclaving step can remove the distortion which is generated in the image display section 130 and the retarder 180 during the vacuum laminating step. The autoclaving step can also squish down or push out the bubbles in the adhesion layer 300 which remain even after the vacuum laminating step.

Figure 13:
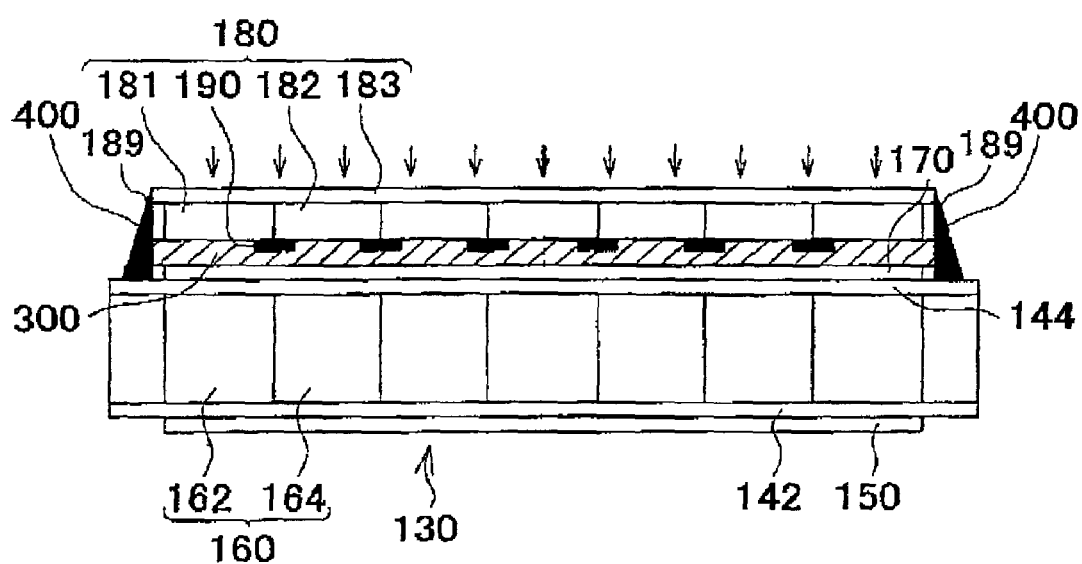
FIG. 13 is a cross-sectional view illustrating an entire surface adhering step.

FIG. 13 is a cross-sectional view illustrating the entire surface UV adhering step. In the entire surface UV adhering step, ultraviolet light is irradiated, through the retarder 180, towards the adhesion layer 300 which has been subjected to the above-described autoclaving step, so as to cure the resin constituting the adhesion layer 300. For example, the irradiated ultraviolet light has an illuminance of 180 mW/cm$^2$, an integral light quantity of 3000 mJ/cm$^2$, and a wavelength of 365 nm. Within the resin constituting the adhesion layer 300, the ultraviolet light is irradiated to the regions formed between the opaque sections 190 of the retarder 180, and the resin in the irradiated regions cures.

In addition, heat is externally applied to the adhesion layer 300 with the use of a heater or the like, so that the entire adhesion layer 300 cures. This heating can cure the resin in the regions to which the ultraviolet light has not been irradiated, thereby adhering together the image display section 130 and the retarder 180 in a more reliable manner. The ultraviolet light irradiation step and the heating step with the heater may be performed at the same time.

The image display section 130 and the retarder 180, which have been adhered to each other in the above-described manner, are attached to the case 110 shown in FIG. 3. In this manner, the three-dimensional image display apparatus 100 is manufactured. The resin forming the adhesion regions 400 has a higher glass transition temperature (Tg) than the resin constituting the adhesion layer 300. For example, while the resin forming the adhesion regions 400 has a glass transition temperature of 80° C. or higher, the resin forming the adhesion layer 300 has a glass transition temperature of 0° C. or lower, to be more specific, −20° C.

In this case, the temperature of the resin forming the adhesion regions 400 is equal to or lower than its glass transition temperature in all of the steps from the periphery applying step to the entire surface UV adhering step. On the other hand, the temperature of the resin forming the adhesion layer 300 is higher than its glass transition temperature in all of the steps after the attaching step. Hence, the resin forming the adhesion layer 300 changes its state from the glass state to the rubber state while the point adhering step, the vacuum laminating step, the autoclaving step, and the entire surface UV adhering step are carried out. On the other hand, the resin forming the adhesion regions 400 maintains the glass state in terms of the viscosity and rigidity, when compared with the resin forming the adhesion layer 300.

For the reasons stated above, even though one of the image display section 130 and the retarder 180 is deformed by the expansion/contraction attributed to the heating carried out in each step after the attaching step, the adhesion layer 300 and the other of the image display section 130 and the retarder 180 can respond to the deformation, according to the present embodiment. The present embodiment can also reduce the misalignment between the image display section 130 and the retarder 180. Therefore, the present embodiment can reduce the occurrence of optical interference (for example, a pattern like Newton's rings) between the image display section 130 and the retarder 180 when the three-dimensional image display apparatus 100 is used (i.e. a three-dimensional image is viewed). In particular, the present embodiment can produce significant effects in improving the image quality of three-dimensional images viewed on a large screen, since the deformation that is generated in the image display section 130 and the retarder 180 increases as the screen size increases.

The image display section 130 and the retarder 180 may have distorted surfaces or uneven thicknesses. According to the present embodiment, however, the adhesion layer 300 with a low viscosity compensates the distortion of the surfaces and the unevenness of the thicknesses. Therefore, a constant distance can be achieved between the image display section 130 and the retarder 180, and the adhesion layer 300 can completely fill the space between the image display section 130 and the retarder 180. Accordingly, the internal reflection can be reduced between the image display section 130 and the retarder 180, and crosstalk can be prevented. Since the present embodiment can reduce the unevenness of the distance between the image display section 130 and the retarder 180, the unevenness in color can be reduced. As a result, the present embodiment can prevent the degradation in the image quality of three-dimensional images.

According to the present embodiment, the glass transition temperature of the resin forming the adhesion regions 400 is equal to or higher than the temperature condition in each step after the point adhering step. Therefore, the adhesion regions 400 maintain sufficient adhesion strength to support the weight of the retarder 180 in each step after the point adhering step, even when the adhesion layer 300 can not maintain sufficient adhesion strength to support the weight of the retarder 180. For this reason, the retarder 180 can be prevented from moving downward due to its own weight. As a consequence, the present embodiment can reduce vertical misalignment of the retarder 180 with respect to the image display section 130.

The glass transition temperature of the resin forming the adhesion regions 400 is higher than the temperature under which the manufactured three-dimensional image display apparatus 100 is expected to be used. Hence, the adhesion regions 400 maintain sufficient adhesion strength to support the weight of the retarder 180, even if the adhesion layer 300 creeps due to the ambient heat under the high-temperature environment, the heat generated by the image display section 130, or the like. Therefore, the present embodiment can prevent the retarder 180 from moving downward due to its own weight when the manufactured three-dimensional image display apparatus 100 is used in the anticipated environment. Consequently, the present embodiment can reduce vertical misalignment of the retarder 180 with respect to the image display section 130.

In the present embodiment, the adhesion regions 400 are formed on the left and right side surfaces of the retarder 180 and at the left and right edge portions of the image display section 130, in such a manner as to be arranged at predetermined intervals. This configuration can decrease the influence of the contraction stress, which is generated when the resin forming the adhesion regions 400 cures, on the retarder 180 and the image display section 130. In the present embodiment, even if the above contraction stress distorts the retarder 180, the adhesion layer 300 can absorb/alleviate the distortion. In this way, the present embodiment can minimize the influence of the distortion of the retarder 180 on the contrast of the image display section 130 (can reduce the occurrence of the unevenness in color).

In the present embodiment, the left and right side surfaces 189 of the retarder 180 are adhered to the left and right edge portions of the image display section 130 by means of the adhesion regions 400. With this configuration, the adhesion regions 400 are positioned outside the image region. As a result, the image region can be used in its entirety. In the present embodiment, the side surfaces 189 of the retarder 180 can be adhered to the exit surface of the image display section 130 by accumulating the adhesive in the corner portions defined by the side surfaces 189 of the retarder 180 and the exit surface of the image display section 130 after the layering step is completed. Consequently, the present embodiment can simplify the adhering processing.

In the present embodiment, the glass substrate 183 of the retarder 180 is adhered at the left and right sides thereof to the exit-side glass substrate 144 of the image display section 130. If the same adhesion strength can be maintained, however, the glass substrate 183 of the retarder 180 may be adhered at both or one of its upper and lower sides to the image display section 130. Here, the glass substrate 183 of the retarder 180 may be realized by using a film base member which has low thermal expansion/contraction. This configuration can reduce the weight of the retarder 180, thereby preventing the retarder 180 from moving downwards. Such a film base member may be adhered to the exit-side glass substrate 144, at its four sides, two sides or one side. When the film base member contracts more significantly than a glass base member, the film base member is preferably adhered at its four sides to the exit-side glass substrate 144.

In the present embodiment, the adhesion regions 400 are spaced away from the exit-side polarization plate 170. This configuration can prevent the thermal expansion/contraction of the exit-side polarization plate 170 from affecting the image display section 130 and the retarder 180 through the adhesion regions 400. In the present embodiment, the glass substrate 183 of the retarder 180, which is directly adhered to the exit-side glass substrate 144 of the image display section 130, has lower thermal expansion/contraction than the retarder 180. Therefore, the present embodiment can further reduce the above-mentioned misalignment.

Figure 14:
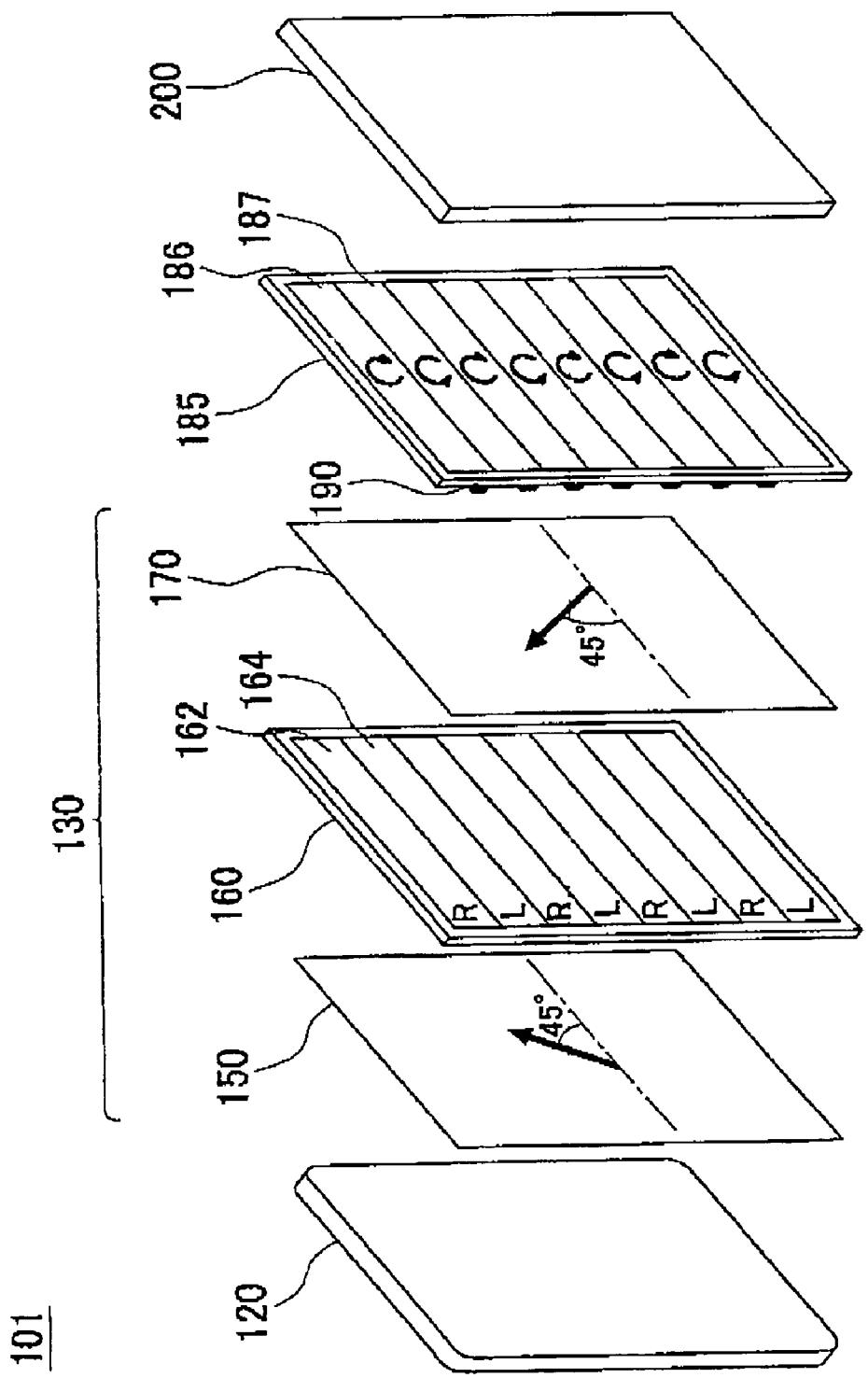
FIG. 14 is an exploded perspective view illustrating a different three-dimensional image display apparatus 101 manufactured by the manufacturing method relating to the present embodiment.

FIG. 14 is an exploded perspective view illustrating a different three-dimensional image display apparatus 101 manufactured by the manufacturing method relating to the present embodiment. Some of the constituents of the three-dimensional image display apparatus 101 illustrated in FIG. 14 are the same as the corresponding constituents of the above-described three-dimensional image display apparatus 100. Such constituents are assigned the same reference numerals and are not explained here. As illustrated in FIG. 14, the three-dimensional image display apparatus 101 is different from the three-dimensional image display apparatus 100 in terms of having a retarder 185, in place of the retarder 180. The retarder 185 has right eye polarization regions 186 and left eye polarization regions 187.

The right eye polarization regions 186 and the left eye polarization regions 187 are both formed by using quarter wave retarders. The optical axis of the right eye polarization regions 186 is orthogonal to the optical axis of the left eye polarization regions 187. Similarly to the positions and sizes of the right eye polarization regions 181 and the left eye polarization regions 182 in the retarder 180, the positions and sizes of the right eye polarization regions 186 and the left eye polarization regions 187 in the retarder 185 are determined in correspondence with the positions and sizes of the right eye image generating regions 162 and the left eye image generating regions 164 in the image generating section 160. Therefore, in the usage state of the three-dimensional image display apparatus 101, the right eye image light which has transmitted through the right eye image generating regions 162 is incident on the right eye polarization regions 186, and the left eye image light which has transmitted through the left eye image generating regions 164 is incident on the left eye polarization regions 187.

The opaque sections 190 are provided on the borders between the right eye polarization regions 186 and the left eye polarization regions 187, on the surface of the retarder 185 which faces the image display section 130. Here, the left eye image light is expected to be incident on each left eye polarization region 187 in the retarder 185, but partial light of the left eye image light actually tends to be incident on right eye polarization regions 186 adjacent to the left eye polarization region 187 across the boarders therebetween. Each opaque section 190 absorbs and thus blocks such partial light.

Similarly, the right eye image light is expected to be incident on each right eye polarization region 186 in the retarder 185, but partial light of the right eye image light actually tends to be incident on left eye polarization regions 187 adjacent to the right eye polarization region 186 across the boarders therebetween. Each opaque section 190 absorbs and thus blocks such partial light. Hence, by providing the opaque sections 190 on the borders in the retarder 185, less crosstalk is generated in the right eye image light and the left eye image light emitted from the three-dimensional image display apparatus 101.

The retarder 185 converts the incident light into circularly polarized light whose polarization axis rotates in a certain direction and into circularly polarized light whose polarization axis rotates in an opposite direction, and emits the circularly polarized light whose polarization axis rotates in a certain direction and the circularly polarized light whose polarization axis rotates in an opposite direction. For example, the right eye polarization regions 186 convert the incident light into circularly polarized light with a clockwise rotating direction and emit the circularly polarized light, and the left eye polarization regions 187 convert the incident light into circularly polarized light with an anticlockwise rotating direction and emits the circularly polarized light. Note that the arrows written in the retarder 185 in FIG. 14 indicate the rotating directions of the polarized light which is generated by the retarder 185. For example, the right eye polarization regions 186 are formed by using quarter wave retarders whose optical axis extends in the horizontal direction, and the left eye polarization regions 187 are formed by using quarter wave retarders whose optical axis extends in the vertical direction.

In the three-dimensional image display apparatus 101 illustrated in FIG. 14, the image generating section 160 and the retarder 185 are adhered to each other by means of the adhesion layer 300 and the adhesion regions 400, as in the three-dimensional image display apparatus 100. With this configuration, the adhesion layer 300 absorbs the deformation and thickness unevenness of the image display section 130 and the retarder 185. Also, the above configuration can reduce the misalignment of the retarder 185 with respect to the image display section 130.

When viewing the three-dimensional image display apparatus 101 having therein the retarder 185 illustrated in FIG. 14, the viewer 500 wears polarized glasses having combinations of a quarter wave retarder and a polarization lens which are respectively positioned in correspondence with the right eye 512 and the left eye 514. Referring to the polarized glasses, the quarter wave retarder positioned in correspondence with the right eye 512 of the viewer 500 has an optical axis extending in the horizontal direction, and the quarter wave retarder positioned in correspondence with the left eye 514 of the viewer 500 has an optical axis extending in the vertical direction. The polarization lens positioned in correspondence with the right eye 512 of the viewer 500 and the polarization lens positioned in correspondence with the left eye 514 of the viewer 500 both have transmission axes extending rightward at an angle of 45° when seen from the viewer 500 and absorption axes extending in the direction orthogonal to the direction of the transmission axes.

When the circularly polarized light whose polarization axis rotates clockwise when seen from the viewer 500 is incident on the combination of the quarter wave retarder and the polarization lens corresponding to the right eye 512 of the viewer 500, the quarter wave retarder having an optical axis extending in the horizontal direction converts the circularly polarized light into linearly polarized light extending rightward at an angle of 45°. The linearly polarized light subsequently transmits through the polarization lens, and is then viewed by the right eye 512 of the viewer 500. On the other hand, when the circularly polarized light whose polarization axis rotates anticlockwise when seen from the viewer 500 is incident on the combination of the quarter wave retarder and the polarization lens corresponding to the left eye 514 of the viewer 500, the quarter wave retarder having an optical axis extending in the vertical direction converts the circularly polarized light into linearly polarized light extending rightward at an angle of 45°. The linearly polarized light subsequently transmits through the polarization lens, and is then viewed by the left eye 514 of the viewer 500. As stated, when the viewer 500 views the three-dimensional image display apparatus 101 with wearing the polarized glasses, what the right eye 512 views can be limited to the right eye image light and what the left eye 514 views can be limited to the left eye image light. As a result, the viewer 500 can perceive a three-dimensional image based on the right eye image light and the left eye image light.

Figure 15:
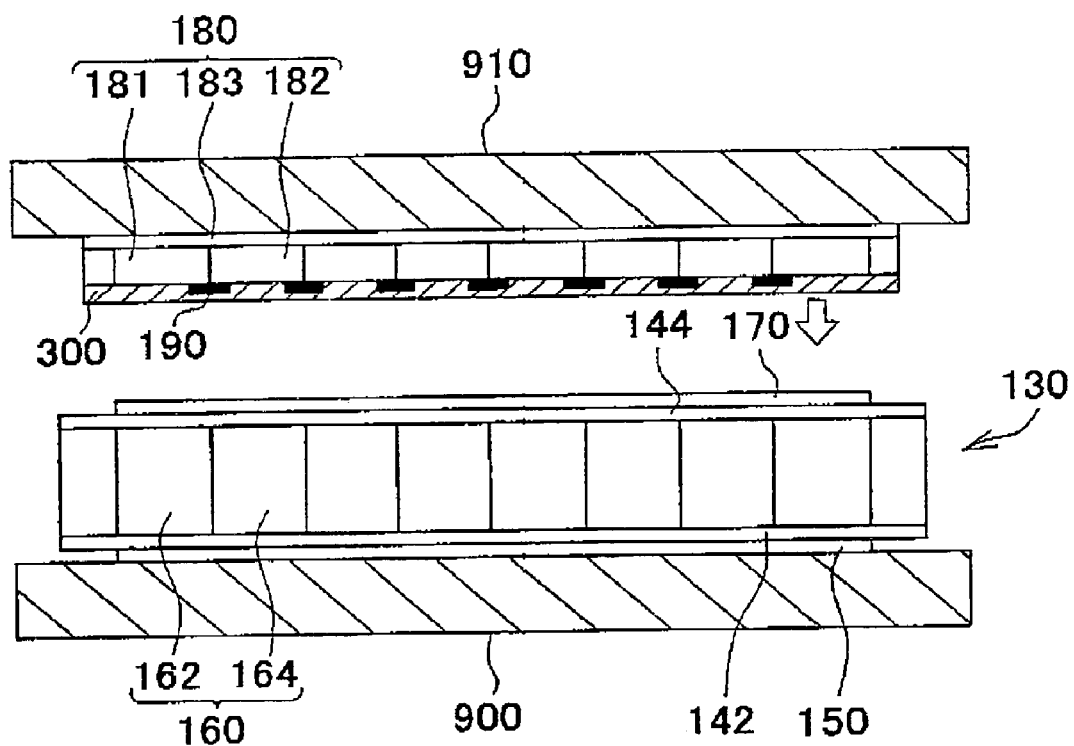
FIG. 15 is a cross-sectional view illustrating a vacuum layering step included in a different manufacturing method relating to an embodiment of the present invention.
Figure 16:
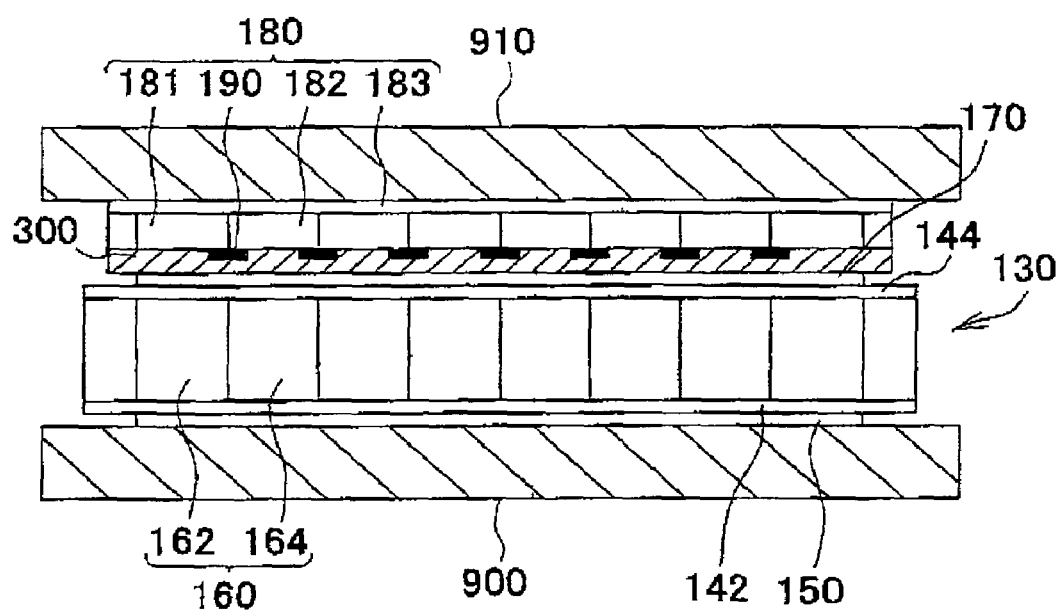
FIG. 16 is a cross-sectional view illustrating the vacuum layering step included in the different manufacturing method relating to the embodiment.

FIGS. 15 and 16 are cross-sectional views illustrating a vacuum layering step included in a different manufacturing method relating to an embodiment of the present invention. The different manufacturing method is different from the manufacturing method described with reference to FIGS. 5 to 13 in terms of having the vacuum layering step in place of the layering step. Some of the configurations and effects of the different manufacturing method are the same as the corresponding configurations and effects of the manufacturing method described with reference to FIGS. 5 to 13. Such configurations and effects are assigned with the same reference numerals as in FIGS. 5 to 13 and not explained here.

In the vacuum layering step, the image display section 130 is placed on a lower plate 900 in such a manner that the exit-side polarization plate 170 faces upward, and the retarder 180 is attached to an upper plate 910 in such a manner that the adhesion layer 300 faces downward, as illustrated in FIG. 15. While this state is maintained, the image display section 130 and the retarder 180 are aligned to each other. The upper and lower plates 910 and 900 are disposed so as to vertically oppose each other within a closed space. The upper plate 910 is configured so as to be capable of coming into contact with and moving away from the lower plate 900.

In the vacuum layering step, after the image display section 130 and the retarder 180 are respectively placed on the lower plate 900 and the upper plate 910, the vacuum atmosphere is realized within the space in which the image display section 130 and the retarder 180 are placed on the lower plate 900 and the upper plate 910. For example, the vacuum of 1 to 1000 Pa is achieved within the space.

As illustrated in FIG. 16, the upper plate 910 is moved towards the lower plate 900, so that the retarder 180 and the image display section 130 are attached with pressure to each other with the adhesion layer 300 therebetween. When this procedure is carried out, how much and how long the adhesion layer 300 is pressed is controlled. For example, the adhesion layer 300 has a thickness of 35 µm before being pressed, but the thickness is reduced by 5 to 25 µm by the pressing procedure. The adhesion layer 300 is kept pressed for a time duration of 10 to 90 seconds.

The above-described vacuum layering step relating to the present embodiment can prevent bubbles from being created between the adhesion layer 300 and the image display section 130 in the layering step, thereby rendering it unnecessary to carry out the vacuum laminating step which aims to eliminate such bubbles. This means that the heating in the vacuum laminating step can be omitted. Here, the heating may cause the misalignment of the retarder 180 with respect to the image display section 130. Therefore, the above-described vacuum layering step can prevent such misalignment.

Figure 17:
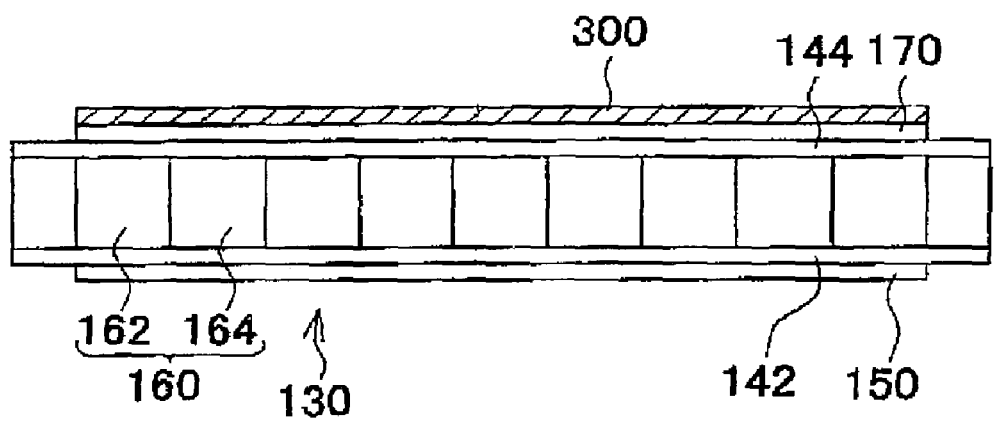
FIG. 17 is a cross-sectional view illustrating an entire surface applying step included in a different manufacturing method relating to an embodiment of the present invention.

FIG. 17 is a cross-sectional view illustrating an entire surface applying step included in a different manufacturing method relating to an embodiment of the present invention. The different manufacturing method is different from the manufacturing method described with reference to FIGS. 5 to 13 in terms of having the entire surface applying step in place of the attaching step. Some of the configurations and effects of the different manufacturing method are the same as the corresponding configurations and effects of the manufacturing method described with reference to FIGS. 5 to 13. Such configurations and effects are assigned with the same reference numerals as in FIGS. 5 to 13 and not explained here.

In the entire surface applying step, a resin is applied to the exit surface of the exit-side polarization plate 170 included in the image display section 130, so as to form the adhesion layer 300, as illustrated in FIG. 17. Here, the resin is applied at least to the region through which the right eye image generating regions 162 and the left eye image generating regions 164 in the image display section 130 oppose the right eye polarization regions 181 and the left eye polarization regions 182 of the retarder 180. Alternatively, the resin may be applied to the entire surface of the exit-side polarization plate 170.

The resin may be applied by using a die coater, a gravure coater or the like. In the entire surface applying step, the thickness of the adhesion layer 300 (before the resin is cured) may be equal to or smaller than the thickness of the opaque sections 190. In the entire surface applying step, the thickness of the adhesion layer 300 (before the resin is cured) can be appropriately determined in accordance with the factors including the area of the depressed portion between adjacent ones of the opaque sections 190 and the thickness of the opaque section 190.

The entire surface applying step preferably uses a resin which cures when exposed to heat as well as ultraviolet light. Such a resin curable by both ultraviolet light and heat may contain an epoxy group and a functional group having an unsaturated double bond in the side chain. Alternatively, a UV-curable resin and a thermosetting resin may be mixed together and the mixture may be applied in the entire surface applying step.

If this is the case, the UV-curable resin may be urethane acrylate, unsaturated polyester acrylate or the like. The thermosetting resin may be an unsaturated polyester resin, a diallyl phthalate resin, a urethane resin or the like. The above-mentioned resin preferably has a viscosity of 500 cps to 1000 cps at a normal temperature (25° C.). When the viscosity is lower than 500 cps, the applied resin may leak outside. When the viscosity is higher than 1000 cps, the resin is less likely to reach the portions between the opaque sections 190, and therefore may not be sufficiently spread all over.

Figure 18:
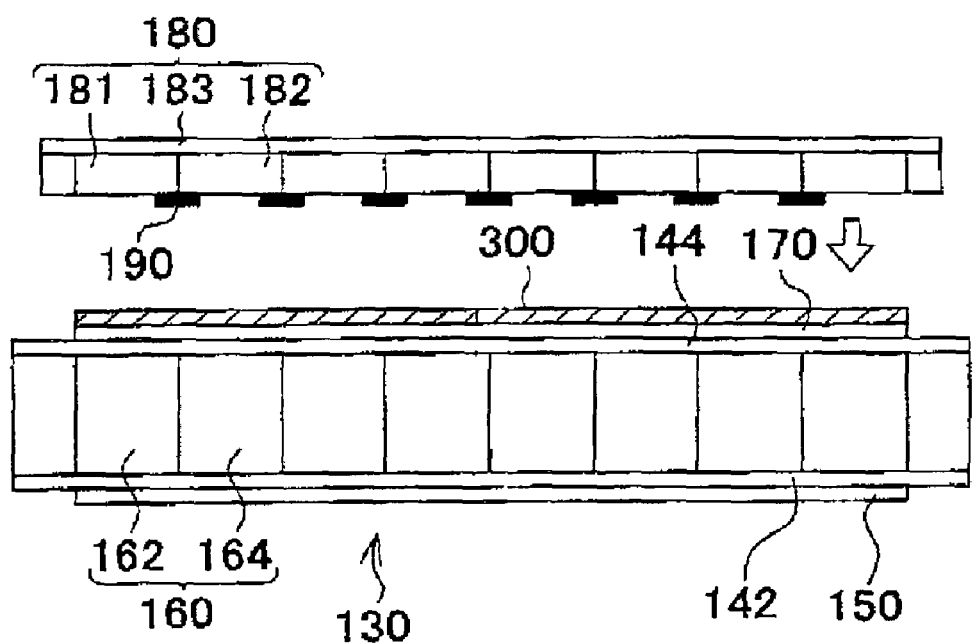
FIG. 18 is a cross-sectional view illustrating a layering step included in the different manufacturing method relating to the embodiment.

FIG. 18 is a cross-sectional view illustrating a layering step. In this layering step, the retarder 180 is placed on the image display section 130 in such a manner that the adhesion layer 300 formed on the image display section 130 faces the opaque sections 190. With the retarder 180 being kept placed on the image display section 130, the image display section 130 and the retarder 180 are put into a vacuum furnace. Subsequently, the pressure inside the vacuum furnace is reduced, so that a deaerating step of deaerating the resin is carried out. In the deaerating step, the resin may be deaerated by supplying ultrasonic oscillation to the image display section 130 and the retarder 180.

FIG. 19 is a cross-sectional view illustrating a laminating step. In this laminating step, the image display section 130 and the retarder 180, which have been subjected to the layering step, are placed on the stage 610 with the retarder 180 facing upward. Subsequently, the roller 600 is rotated while pressing down the glass substrate 183 of the retarder 180. In this manner, the image display section 130 and the retarder 180 are laminated together. The laminating step can enable the adhesion layer 300 to have an even thickness, thereby enhancing the flatness of the image display section 130 and the retarder 180 and the degree of parallelism between the image display section 130 and the retarder 180.

On completion of the laminating step, the adhesion layer 300 preferably has the same thickness as the opaque sections 190. In the laminating step, the roller may be rotated so as to move in the direction in which the right eye image generating regions 162 and the left eye image generating regions 164 are adjacent to each other, as illustrated in FIG. 19. Alternatively, the roller may be rotated so as to move in the direction orthogonal to the moving direction illustrated in FIG. 19, that is to say, in the direction in which the right eye image generating regions 162 and the left eye image generating regions 164 extend.

After the laminating step, the image display section 130 and the retarder 180 may be aligned to each other. Here, the alignment may be made easier by mixing a silica filler, as a spacer, into the adhesion layer 300. Note that the entire surface applying step, the layering step, and the laminating step may be carried out within a vacuum furnace with a reduced pressure. In this case, the resin can be deaerated more effectively, which results in a higher productivity.

Although some aspects of the present invention have been described by way of exemplary embodiments, it should be understood that those skilled in the art might make many changes and substitutions without departing from the spirit and the scope of the present invention which is defined only by the appended claims. For example, the opaque sections 190 are provided on the borders between the right eye polarization regions 181 and the left eye polarization regions 182 in the present embodiment. However, the opaque sections 190 may not be necessarily provided if crosstalk can be prevented without the opaque sections 190. By omitting the opaque sections 190, the viewing angle can be further increased.

What is claimed is:

1. A three-dimensional image display apparatus comprising:
    an image display section that includes an image generating section constituted by a right eye image generating region for generating right eye image light and a left eye image generating region for generating left eye image light, the image display section emitting (i) the right eye image light as linearly polarized light whose polarization axis extends in a given direction and (ii) the left eye image light as linearly polarized light whose polarization axis extends in a direction parallel to the given direction;
    a retarder that is positioned in front of the image display section in a light proceeding direction, the retarder including a right eye polarization region and a left eye polarization region;
    an adhesion layer that adheres together an exit surface of the image display section and an entrance surface of the retarder, the adhesion layer being provided in a region in which the right eye polarization region and the left eye polarization region of the retarder overlap the right eye image generating region and the left eye image generating region of the image display section; and
    an adhesion region that adheres together a periphery portion of the image display section and a periphery portion of the retarder, wherein
    when the right eye image light and the left eye image light emitted from the image display section are respectively incident on the right eye polarization region and the left eye polarization region of the retarder, the retarder (I) emits the right eye image light as linearly polarized light whose polarization axis extends in a certain direction and emits the left eye image light as linearly polarized light whose polarization axis extends in a direction orthogonal to the certain direction, or (II) emits the right eye image light as circularly polarized light whose polarization axis rotates in one direction and emits the left eye image light as circularly polarized light whose polarization axis rotates in an opposite direction,
    a glass transition temperature of an adhesive forming the adhesion region is higher than a glass transition temperature of an adhesive forming the adhesion layer, and
    the glass transition temperature of the adhesive forming the adhesion region is 80° C. or higher, and the glass transition temperature of the adhesive forming the adhesion layer is 0° C. or lower.

2. The three-dimensional image display apparatus as set forth in claim 1, wherein
    a plurality of adhesion regions are provided along an edge of the retarder, and are spaced away from each other.

3. The three-dimensional image display apparatus as set forth in claim 2, wherein
    the plurality of adhesion regions adhere a side surface of the retarder and the image display section to each other.

4. The three-dimensional image display apparatus as set forth in claim 3, wherein
    the image display section includes a glass substrate and a polarization plate that is attached to a surface of the glass substrate which is closer to the retarder, and
    the plurality of adhesion regions adhere the glass substrate and the retarder to each other.

5. The three-dimensional image display apparatus as set forth in claim 4, wherein the plurality of adhesion regions are spaced away from the polarization plate.

6. The three-dimensional image display apparatus as set forth in claim 4, wherein
    the retarder includes a glass substrate that supports the right eye polarization region and the left eye polarization region, and
    the plurality of adhesion regions adhere, at least, a pair of opposing edges of the glass substrate in the retarder, to the glass substrate in the image display section.

7. A three-dimensional image display apparatus comprising:
    an image display section that includes an image generating section constituted by a right eye image generating region for generating right eye image light and a left eye image generating region for generating left eye image light, the image display section emitting (i) the right eye image light as linearly polarized light whose polarization axis extends in a given direction and (ii) the left eye image light as linearly polarized light whose polarization axis extends in a direction parallel to the given direction;
    a retarder that is positioned in front of the image display section in a light proceeding direction, the retarder including a right eye polarization region and a left eye polarization region;
    an adhesion layer that adheres together an exit surface of the image display section and an entrance surface of the retarder, the adhesion layer being provided in a region in which the right eye polarization region and the left eye polarization region of the retarder overlap the right eye image generating region and the left eye image generating region of the image display section; and
    an adhesion region that adheres together a periphery portion of the image display section and a periphery portion of the retarder, wherein
    when the right eye image light and the left eye image light emitted from the image display section are respectively incident on the right eye polarization region and the left eye polarization region of the retarder, the retarder (I) emits the right eye image light as linearly polarized light whose polarization axis extends in a certain direction and emits the left eye image light as linearly polarized light whose polarization axis extends in a direction orthogonal to the certain direction, or (II) emits the right eye image light as circularly polarized light whose polarization axis rotates in one direction and emits the left eye image light as circularly polarized light whose polarization axis rotates in an opposite direction,
    a glass transition temperature of an adhesive forming the adhesion region is higher than a glass transition temperature of an adhesive forming the adhesion layer, and
    the glass transition temperature of the adhesive forming the adhesion layer is −20° C.

8. The three-dimensional image display apparatus as set forth in claim 7, wherein
    a plurality of adhesion regions are provided along an edge of the retarder, and are spaced away from each other.

9. The three-dimensional image display apparatus as set forth in claim 8, wherein the plurality of adhesion regions adhere a side surface of the retarder and the image display section to each other.

10. The three-dimensional image display apparatus as set forth in claim 9, wherein the image display section includes a glass substrate and a polarization plate that is attached to a surface of the glass substrate which is closer to the retarder, and the plurality of adhesion regions adhere the glass substrate and the retarder to each other.

11. The three-dimensional image display apparatus as set forth in claim 10, wherein the plurality of adhesion regions are spaced away from the polarization plate.

12. The three-dimensional image display apparatus as set forth in claim 10, wherein the retarder includes a glass substrate that supports the right eye polarization region and the left eye polarization region, and the plurality of adhesion regions adhere, at least, a pair of opposing edges of the glass substrate in the retarder, to the glass substrate in the image display section.

* * * * *